April 18, 1933. W. M. NECKERMAN 1,904,950
PIPE FACING TOOL
Filed July 25, 1930
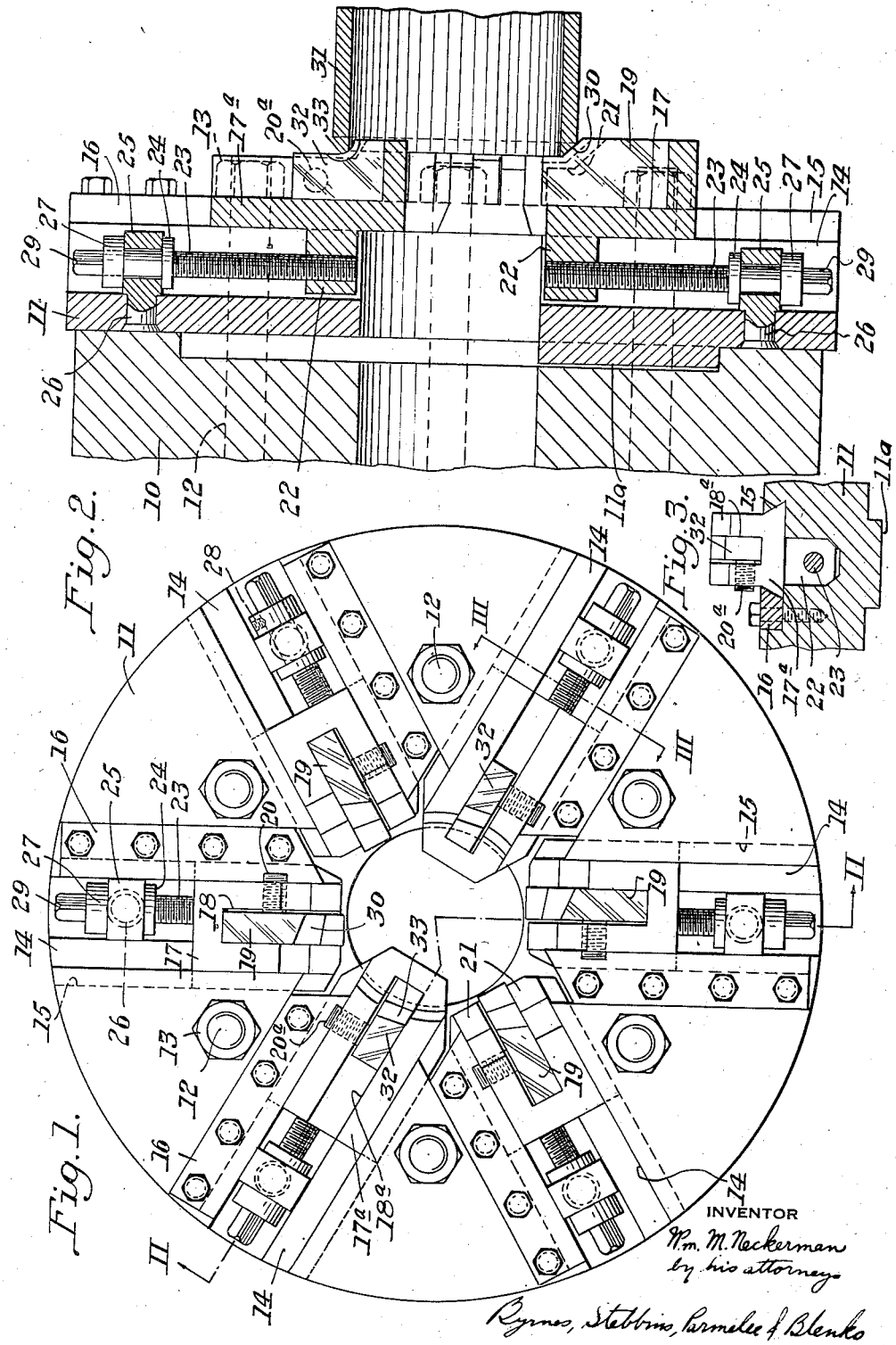

Patented Apr. 18, 1933

1,904,950

UNITED STATES PATENT OFFICE

WILLIAM M. NECKERMAN, OF YOUNGSTOWN, OHIO, ASSIGNOR TO REPUBLIC STEEL CORPORATION, OF YOUNGSTOWN, OHIO, A CORPORATION OF NEW JERSEY

PIPE FACING TOOL

Application filed July 25, 1930. Serial No. 470,684.

My invention relates to a tool and mechanism for facing the ends of pipe after it has been cut to lengths.

For convenience in manipulation and speed of operation, it is desirable that a machine for facing the ends of pipe be readily adjustable for different sizes of pipe. It is also desirable that the cutters employed be easily removable for replacement and sharpening. It is essential, furthermore, that the cutters be held rigidly by the machine when in operative position.

I have invented a pipe facing device which is characterized by all of the foregoing desirable features and, in addition, serves to face both the inner wall and the outer wall of the pipe in one operation. This device materially reduces the amount of time and labor formerly consumed in the pipe facing operation, and saves a large amount of handling.

The accompanying drawing illustrates a present preferred embodiment of the invention, although other forms than that shown will probably occur to those skilled in the art. The drawing, therefore, is intended merely as illustration, and not as a limitation upon the scope of the invention.

In the drawing,

Figure 1 is a front elevation of one form of a head for facing machines;

Figure 2 is a sectional view thereof on the line II—II of Figure 1; and

Figure 3 is a sectional detail view taken on the line III—III of Figure 1.

Referring in detail to the drawing, a rotary head 10 is provided with a face plate 11. The head 10 may be supported on and driven by any suitable power mechanism. The plate 11 is a single casting, and is secured to the head 10 by bolts 12 and nuts 13. Lugs 11a projecting from the back of the plate 11 fit into correspondingly shaped recesses in the head to key the plate thereto.

The plate 11 has radial slots 14 formed therein. One side of each slot is undercut at 15. A gib 16 overlies the other edge of the slot to hold a slide block 17 reciprocably in each slot 14. Screws 16a secure the gib on the plate 11.

Each block 17 is recessed at 18 and accommodates a cutter 19. A clamp screw 20 secures the cutter in the slot. The ends of the block 17 extend almost to the end of the cutter and are suitably shouldered at 21 to provide proper clearance and lateral support for the cutter.

A lug 22 projects rearwardly from the block 17 and is threaded internally for co-operation with a screw 23. The screw 23 has an integral collar 24 and traverses a sleeve 25 fixed to a stud 26 carried by the plate 11. A lock collar 27 is secured to the screw above the sleeve 25 by a set screw 28. The end 29 of the screw 23 is squared for cooperation with a socket wrench.

The cutter 19 has a beveled edge 30 for facing the outer wall of a pipe, such as that shown at 31, which may be supported on any suitable means. In order to face the inner wall of the pipe 31, I provide some of the slots 14 in the plate 11 with slide blocks 17a which differ slightly in construction from those shown at 17. The blocks 17a are recessed from the outer end at 18a instead of from the inner end as in the case of the blocks 17. Cutters 32, having an arcuate cutting edge 33 for cooperating with the inner wall of the pipe 31, are secured in the recesses in the blocks 17a by clamping studs 20a. The means for adjusting the blocks 17a is identical with that shown and described for adjusting the block 17, as will be obvious from a study of the drawing.

As will be apparent in Figure 2, the cutters 32 are supported by the holders 17a against inward movement; while the cutters 19 are likewise secured against outward movement by the blocks 17. Substantial radial support is thus afforded for both the internal and external facing cutters.

The invention provides a device which is readily adjustable for facing different sizes of pipe. In addition, the cutters are firmly supported closely adjacent their cutting edges, at the same time being readily removable for sharpening or replacement. A great advantage of the invention is the fact that it faces both the inside and outside of the pipe in one operation. The cutter holders may be easily removed by taking off the gib 16, in case it is desired to change the relative number of inside and outside cutters, without interference by the screw 23 or the sleeve 25.

Although I have illustrated and described but a single preferred embodiment of the invention, it is obvious that numerous changes in this embodiment may be made within the scope of the following claims, without departing from the spirit of the invention.

I claim:

1. In a pipe-finishing device, a rotary head, radial slots therein, tool blocks reciprocable in said slots, radial recesses in said blocks extending to the inner end only of some blocks and to the outer ends only of others, and cutting tools seated in said recesses and engaging the closed ends thereof whereby the tools are firmly supported against radial displacement.

2. In a pipe finishing device, a rotary head having radial slots formed therein, tool retaining blocks slidably mounted in the slots, a plurality of cutters for simultaneously acting on the end of the pipe, certain of said cutters adapted to engage the inner wall of the pipe and the other of said cutters adapted to engage the outer wall of the pipe, said blocks having recesses with closed ends formed therein and adapted to receive said cutters, and bearing surfaces adjacent the closed end of said tool receiving slots against which the tool bears thereby presenting a firm support for the tool during the cutting operation.

In testimony whereof I have hereunto set my hand.

WILLIAM M. NECKERMAN.